(12) United States Patent
Iurissevich

(10) Patent No.: US 12,066,912 B2
(45) Date of Patent: Aug. 20, 2024

(54) MONITORING SYSTEM CONTROL UNIT COUPLED TO DEVICE DATABASE VIA THE INTERNET

(71) Applicant: Honeywell International Inc., Charlotte, NC (US)

(72) Inventor: Daniele Iurissevich, Trieste (IT)

(73) Assignee: Honeywell International Inc., Charlotte, NC (US)

( * ) Notice: Subject to any disclaimer, the term of this patent is extended or adjusted under 35 U.S.C. 154(b) by 7 days.

(21) Appl. No.: 17/745,927

(22) Filed: May 17, 2022

(65) Prior Publication Data
US 2022/0276944 A1    Sep. 1, 2022

Related U.S. Application Data

(63) Continuation of application No. 16/524,718, filed on Jul. 29, 2019, now Pat. No. 11,334,460, which is a continuation of application No. 14/644,362, filed on Mar. 11, 2015, now Pat. No. 10,372,577.

(51) Int. Cl.
*G06F 11/30* (2006.01)
*G06F 11/00* (2006.01)
*G06F 16/25* (2019.01)

(52) U.S. Cl.
CPC .............. *G06F 11/30* (2013.01); *G06F 11/00* (2013.01); *G06F 11/3013* (2013.01); *G06F 11/3051* (2013.01); *G06F 16/25* (2019.01)

(58) Field of Classification Search
None
See application file for complete search history.

(56) References Cited

U.S. PATENT DOCUMENTS

| | | | |
|---|---|---|---|
| 5,288,980 A | 2/1994 | Patel et al. | |
| 6,598,790 B1 | 7/2003 | Horst | |
| 8,837,805 B1 | 9/2014 | Aviyants | |
| 9,455,872 B2 | 9/2016 | Lingen | |
| 9,607,486 B2 | 3/2017 | Acker, Jr. et al. | |
| 10,642,849 B2 | 5/2020 | Gifford et al. | |
| 2002/0061758 A1 | 5/2002 | Zarlengo et al. | |
| 2006/0218061 A1* | 9/2006 | Mouline | G06Q 40/00 705/35 |
| 2008/0037856 A1 | 2/2008 | Paraskevakos | |
| 2009/0083475 A1* | 3/2009 | Hsiao | G06F 8/65 711/E12.008 |
| 2012/0054049 A1 | 3/2012 | Hayes | |
| 2013/0102018 A1* | 4/2013 | Schentag | G01N 21/05 435/25 |
| 2014/0358777 A1 | 12/2014 | Gueh | |
| 2015/0270961 A1 | 9/2015 | Barnett et al. | |
| 2016/0034329 A1* | 2/2016 | Larson | G06F 11/3089 702/188 |

* cited by examiner

*Primary Examiner* — Craig C Dorais
(74) *Attorney, Agent, or Firm* — Brooks, Cameron & Huebsch, PLLC

(57) ABSTRACT

Information as to a group of devices which are part of a monitoring system, can be accumulated in one or more databases. The databases can be addressed via a computer network, such as the Internet. Monitoring systems can access one or more of the databases seeking identification of those devices that correspond to a selected criterion. A database can provide serial numbers of devices that meet the selected criteria. The respective monitoring system can determine if any local devices have serial numbers that match the received serial numbers. A trouble indicator can be generated in response thereto.

11 Claims, 3 Drawing Sheets

MONITORING SYSTEM CONTROL UNIT COUPLED TO DEVICE DATABASE VIA THE INTERNET

PRIORITY INFORMATION

This application is a Continuation of U.S. application Ser. No. 16/524,718, filed Jul. 29, 2019, which is a Continuation of U.S. application Ser. No. 14/644,362, filed Mar. 11, 2015 and issued as U.S. Pat. No. 10,372,577 on Aug. 6, 2019, the contents of which are incorporated herein by reference.

FIELD

The application pertains to alarm monitoring systems and methods wherein data pertaining to devices in such systems can be retrieved from a common database. More particularly, the application pertains to such systems and methods wherein pre-stored information concerning device status can be retrieved from a common database via a computer network such as the Internet.

BACKGROUND

Monitoring systems, to detect fire conditions, gas concentrations, or intruders into a premises are known and very useful. Such systems might each include dozens or hundreds of detectors or other monitoring devices. At times there is a need to locate various of the detectors or devices based on a specified parameter. For example, a specific batch of devices might need to be located. Batches might be defined by a specified manufacturing facility, date, design version or the like. Determining where the detectors or devices of interest are installed can be a very laborious and time consuming activity.

DETAILED DESCRIPTION

Figure 1:
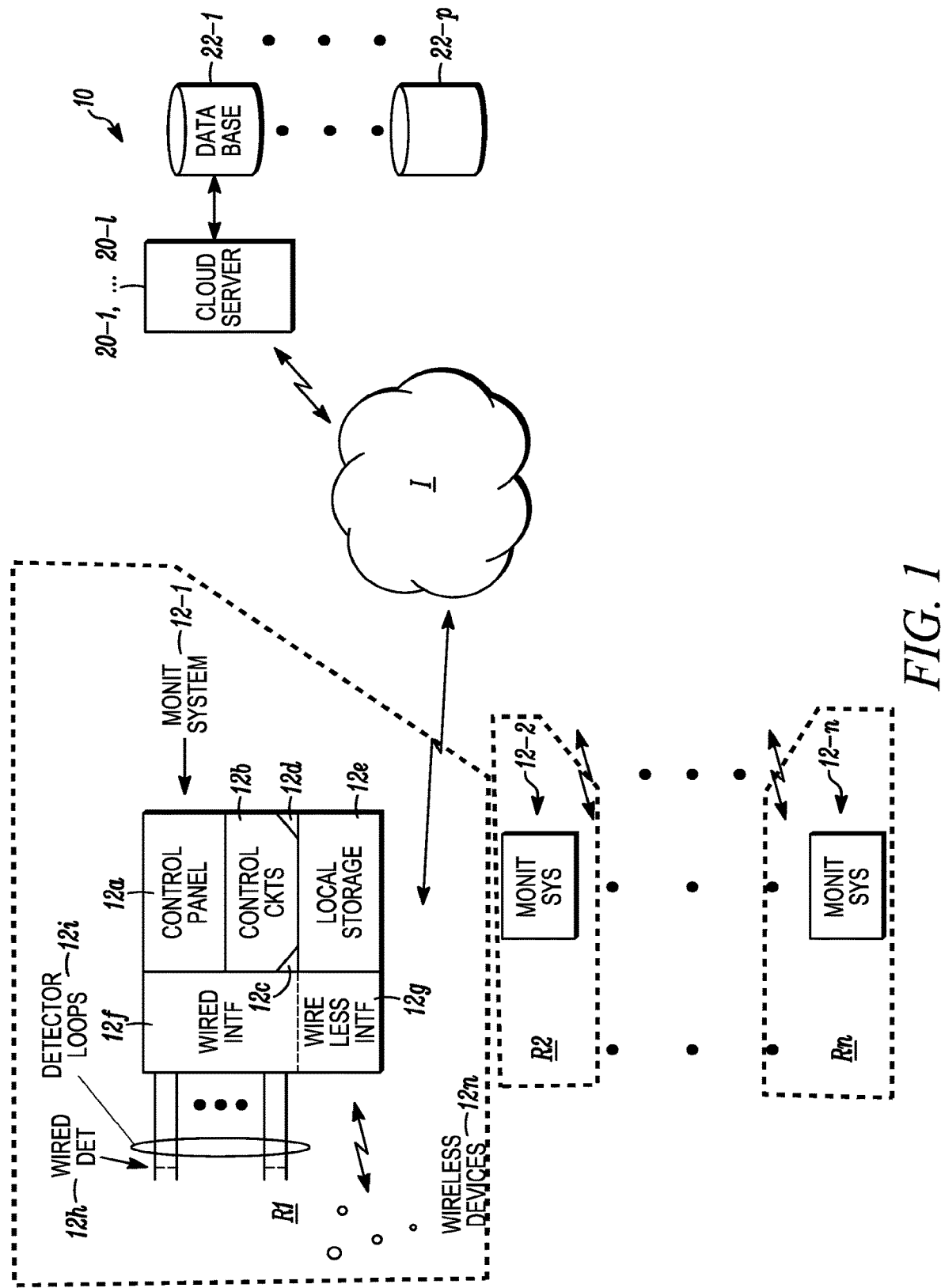
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

In one aspect, embodiments hereof can query a database for serial numbers of detectors or devices of interest, based on a specified criterion, which might have been installed in a particular monitoring system, or a plurality of monitoring systems. In response thereto, those serial numbers can be compared to the serial numbers of devices or detectors installed in a monitoring system. This process can be conducted substantially in parallel by each member of a plurality of monitoring systems.

For example, the database could have stored therein serial numbers of detectors or devices made at a designated plant, or in accordance with a particular design or revision to a design. Other possibilities include, without limitation, detectors with a particular month or year of manufacture, or those that exhibit predetermined quality characteristics. Serial numbers of detectors or devices with other types of characteristics, without limitation, can also be stored in a database.

In another aspect, control units, or control panels of monitoring systems can be in communication with the database via a computer network, such as the Internet. Based on a query from the control panel, one or more serial numbers of detectors or devices that fit the characteristics provided in the query can be automatically downloaded from the database to the control panel.

The control panel can then automatically compare the received serial numbers to those coupled to that control panel and determine which if any have a serial number that is the same as one of those received from the database. Detectors or devices with matching serial numbers can be identified for removal or other processing.

FIG. 1 illustrates a combination 10 in accordance herewith. The combination 10 includes a plurality of monitoring systems 12-1, -2 . . . -n each of which is associated with a particular region such as R1, R2 . . . Rn being monitored. The regions Ri need not be physically near one another.

System 12-1 is representative of the remaining systems 12-2 . . . 12-n and a description of system 12-1 shall suffice as a description of the remaining systems as would be understood by those of skill in the art. System 12-1 includes a control unit, or panel 12a. Components of panel 12a include control circuits 12b which could be implemented at least in part by a programmed processor 12c and executable control instructions 12d. Circuits 12b are coupled to and communicate with local storage 12e which can store information including serial numbers, conditions of interest, lists of detectors and the like, all without limitation.

The control panel 12a can also include a wired interface for communicating with wired devices or detectors 12h which are coupled to the interface 12f by a plurality of detector wired loops 12i. The panel 12a can also include a wireless interface 12g. Interface 12g can provide wireless communications to a plurality of wireless devices 12n which without limitation could include various types of ambient condition detectors, thermostats, door and window monitoring units, all without limitation. The wireless interface 12g can also provide communication with one or more computer networks, for example via an Ethernet connection to the internet I.

The systems 12i function independently of one another but all are internet enabled either wirelessly, or by broadband cable and can communicate via the internet I with one or more cloud servers such as 20-1 . . . 20-1. The one or more cloud servers are in turn coupled to databases 22-1 . . . 22-p. It will be understood that the servers 20-I and databases 22-I can be associated with different manufacturing sites. The database(s) can include information pertaining to detectors or devices, which can be automatically searched in response to a supplied key, parameter, or characteristic, all without limitation.

Figure 2:
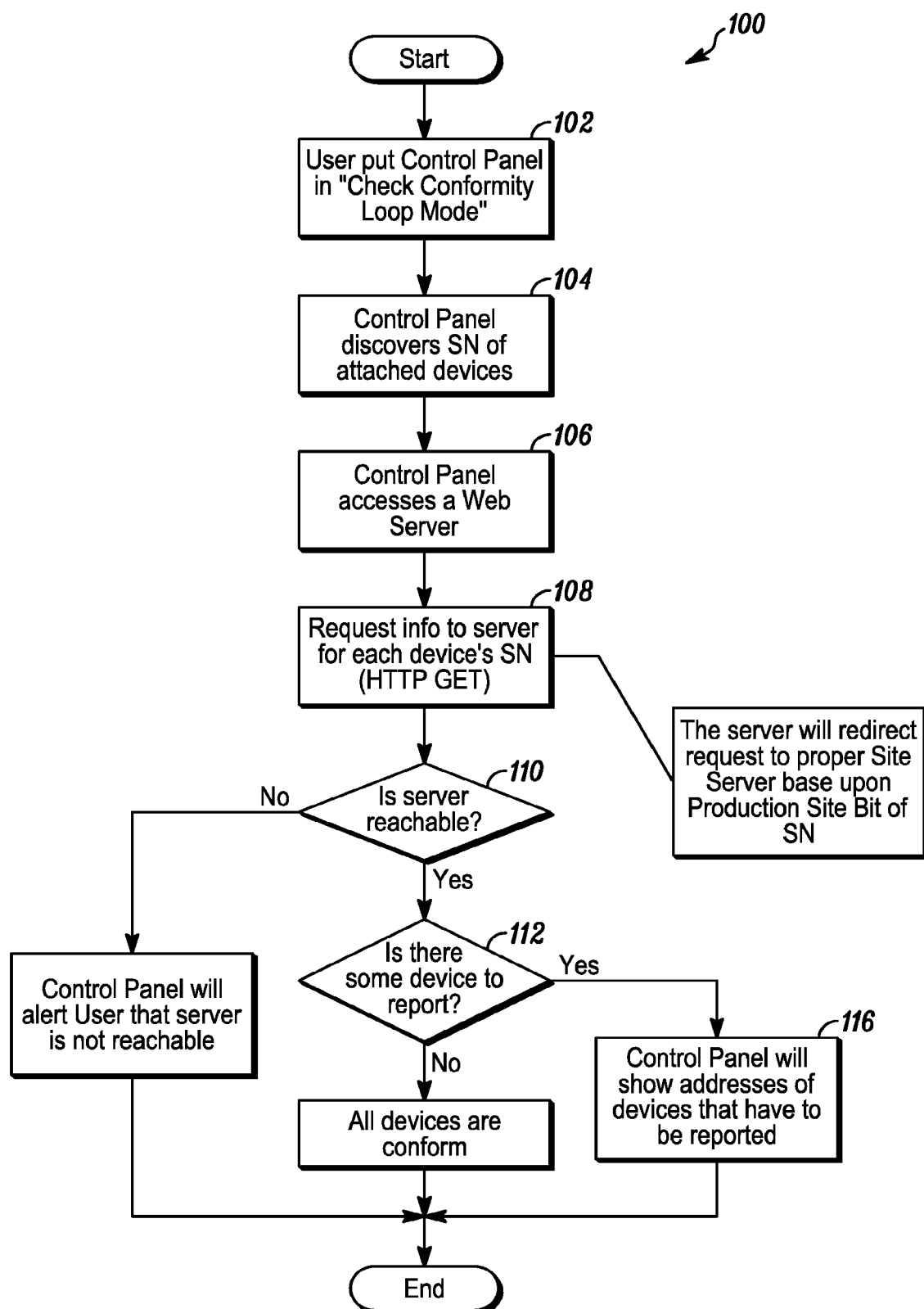
FIG. 2 is a flow chart which illustrates aspects of a method in accordance herewith.
Figure 3:
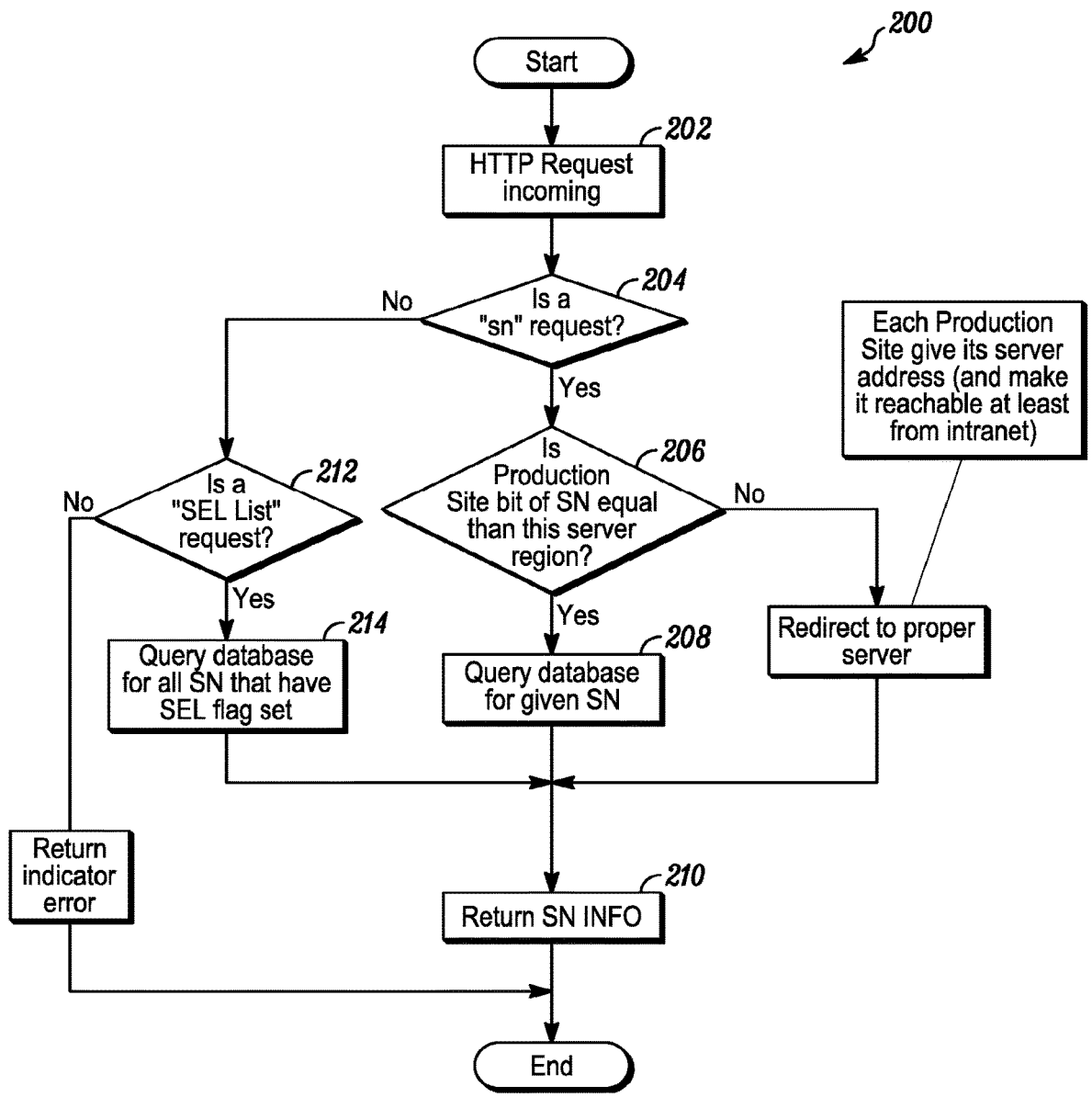
FIG. 3 is a flow chart which illustrates additional aspects of a method in accordance herewith.

FIGS. 2, 3 illustrate aspects of methods 100, 200 of operation of the system 12-1 in conjunction with a server 20-I and a database 22-i. It will be understood that while methods 100, 200 relate to determining if one or more detectors associated with panel 12a are in conformity with a predetermined condition, other conditions or criteria can be used to determine the locations and/or status of various of the detectors or devices such as 12h, or 12n all without limitation.

In FIG. 2, a user can put the control panel 12a of system 12-1 for example, into a mode to locate non-conforming detectors or devices, as at 102. The panel can determine the serial numbers of attached devices or detectors, as at 104.

A web server can be accessed by the panel, as at 106. The panel 12a can send a request to the database, such as 22-1, to identify non-conforming devices, as at 108.

Where the server is reachable, as at 110, the request is responded to and where there are non-conforming devices to report, as at 112, the control panel can specify addresses of local devices to be reported, as at 116.

In FIG. 3 processing 200 at the server 20-1 and database 22-1 is illustrated. An incoming request is received as at 202. The type of request is evaluated as at 204. If a serial number request is received, a determination is made, as at 206, as to the proper server to respond. The appropriate database is queried, as at 208. Information as to that serial number can be return to the control panel, for example panel 12a, as at 210.

Where serial numbers that might be collected on a specified list are requested, as at 212, the respective database is queried for all of the serial numbers that have a selected flag set, as at 214. The appropriate group of serial numbers can then be returned to the requesting panel, as at 210.

In summary, in embodiments hereof a control panel can access a displaced database for information, for example a group of serial numbers, which are associated with a predetermined parameter, condition or state, without limitation. That information can then be returned to the panel so that those detectors, or devices in the group and associated with that panel can be removed, tested or adjusted as needed. This process can be on-going, essentially simultaneously at a plurality of panels such as 12-1 . . . 12-n.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A control panel, comprising:
   a storage medium; and
   a processor configured to execute instructions stored in the storage medium to:
      query a database for serial numbers of monitoring devices installed in a monitoring system;
      compare serial numbers of a plurality of monitoring devices of the monitoring system and the queried serial numbers of the installed monitoring devices;
      determine, based on the comparison, whether a discovered serial number specifically matches any of the queried serial numbers; and
      identify, in response to the discovered serial number of a monitoring device in the monitoring system specifically matching any of the queried serial numbers, the monitoring device as a non-conforming device, the non-conforming device being a device made during a particular date range of manufacture, wherein the particular date range of manufacture corresponds with other devices of a same make as the monitoring devices installed in the monitoring system, and the other devices are known to be non-conforming devices.

2. The control panel of claim 1, wherein the serial numbers indicate the particular date range of manufacture of the monitoring devices installed in the monitoring system.

3. The control panel of claim 1, wherein the processor is configured to execute the instructions to query the database for the serial numbers of the monitoring devices installed in the monitoring system in response to the control panel being in a mode to locate non-conforming devices.

4. A system, comprising:
   a database; and
   a control panel configured to:
      query the database for serial numbers of monitoring devices installed in a monitoring system;
      compare serial numbers of a plurality of monitoring devices of the monitoring system and the queried serial numbers of the installed monitoring devices;
      determine, based on the comparison, whether a discovered serial number and queried serial number matches; and
   identify, in response to the discovered serial number of a monitoring device in the monitoring system specifically matching any of the queried serial numbers, the monitoring device as a non-conforming device, the non-conforming device being a device made during a particular date range of manufacture, wherein the particular date range of manufacture corresponds with other devices of a same make as the monitoring devices installed in the monitoring system, and the other devices are known to be non-conforming devices.

5. The system of claim 4, wherein the control panel is configured to discover a respective serial number of each of the plurality of monitoring devices of the monitoring system.

6. The system of claim 4, wherein the control panel is configured to compare the queried serial numbers and the discovered serial number.

7. A method, comprising:
   transmitting, by a control panel, a database query to a server for serial numbers of monitoring devices installed in a monitoring system;
   querying, by the server, the database based on a request type of the database query;
   downloading, by the control panel, the serial numbers of the monitoring devices installed in the monitoring system from the database in response to the query of the database;
   comparing, by the control panel, discovered serial numbers of a plurality of monitoring devices and the queried serial numbers of the installed monitoring devices;
   determining, by the control panel based on the comparison, whether a discovered serial number and queried serial number matches; and
   identifying, by the control panel in response to the discovered serial number of a monitoring device in the monitoring system specifically matching any of the queried serial numbers, the monitoring device as a non-conforming monitoring device, the non-conforming device being a device made during a particular date range of manufacture, wherein the particular date range of manufacture corresponds with other devices of a same make as the monitoring devices installed in the monitoring system, and the other devices are known to be non-conforming devices.

8. The method of claim 7, wherein the method further comprises signaling an alarm in response to the monitoring device being identified as a non-conforming device.

9. The method of claim 7, wherein the method comprises transmitting the database query to the server by the control panel when the server is reachable.

10. The method of claim 7, wherein the method comprises generating, by the control panel, an alert in response to the server not being reachable.

11. The method of claim 7, wherein the method comprises:
   receiving, by the server, the database query that includes the request type, wherein the request type is a serial number request; and
   downloading, by the control panel, the serial numbers of the monitoring devices corresponding to the serial number request.

\* \* \* \* \*